3,679,646
PREPARATION OF POLYVINYL ALCOHOL HAVING IMPROVED COLOR PROPERTIES BY TREATING THE POLYVINYL ESTER WITH AN ALKALI METAL BOROHYDRIDE
John E. Bristol, Niagara Falls, N.Y., assignor to E. I. du Pont de Nemours and Company, Wilmington, Del.
No Drawing. Filed Aug. 5, 1970, Ser. No. 61,464
Int. Cl. C08f 27/16
U.S. Cl. 260—91.3 PV                    5 Claims

ABSTRACT OF THE DISCLOSURE

Polyvinyl alcohol having improved color properties is prepared in a process in which an alcoholic solution of the polyvinyl ester utilized to prepare the polyvinyl alcohol is treated with an alkali metal borohydride prior to the alcoholysis of the polyvinyl ester to the corresponding polyvinyl alcohol.

BACKGROUND OF THE INVENTION

Field of invention

This invention relates to a process for the preparation of polyvinyl alcohol having improved color properties.

Prior art

Polyvinyl alcohol is prepared by forming an alcoholic solution of a polyvinyl ester, such as polyvinyl acetate, polyvinyl propionate or polyvinyl butyrate, and subjecting this solution to alcoholysis at temperatures of about 50° C. and higher, with the aid of an alkali metal alcoholate catalyst. This process is described in detail in U.S. Pat. 2,734,048. The process described in Pat. 2,734,048 is rapid; however, the polyvinyl alcohol produced may have poor color qualities. That is, polyvinyl alcohol powder produced by the process of Pat 2,734,048 may have a yellow to tan color rather than the desired white color, and polyvinyl alcohol in the form of thin films cast from aqueous polyvinyl alcohol solutions may have a yellow to tan color rather than being a clear, colorless product.

The presence of color in polyvinyl alcohol is troublesome in many applications. For example, polyvinyl alcohol is used as a binder in paper-making processes and as a sizing agent in knitting and weaving of various textile products. Polyvinyl alcohol is a particularly desirable textile size as a substitute for starch, since waste fluids from the sizing operation containing starch are pollutants, whereas waste fluids containing polyvinyl alcohol are not pollutants. In paper-making, textile and similar applications, color-free materials are obviously desirable. Polyvinyl alcohol is also converted into products widely used in film form as a structural component in glass laminates acting to prevent the shattering of glass on impact, in such use, color-free polyvinyl alcohol is essential. Therefore, it is desirable to produce polyvinyl alcohol which will be substantially colorless in solution and when made into films for the various applications discussed above.

The prior art teaches that the color formation in poly- vinyl alcohol may be due to reactions of small or trace amounts of impurities which are potential color formers, such as aldehydes or other potential chromophoric atomic groupings, which are present in the polyvinyl alcohol as the result of the alcoholysis of the polyvinyl ester with the aid of alkali metal alcoholate catalyst. It is also thought that unsaturated groups found in the alcoholic solutions of the polyvinyl esters subjected to alkaline alcoholysis may be color precursors and that color formation is intensified during alcoholysis by reaction through the unsaturated bonds.

Since the problem of color formation in polyvinyl alcohol is well known in the art, many attempts have been made to prepare polyvinyl alcohol which is color free and which will remain color free when utilized in many applications. The various suggestions which have been made to improve the color properties of polyvinyl alcohol generally fall into one of the following categories: pretreating the polyvinyl ester prior to alcoholysis; treatment of the polyvinyl alcohol after alcoholysis; or treatment of the polyvinyl ester as it undergoes alcoholysis.

For example, British Pat. 808,108 describes a process for the production of color-free polyvinyl alcohol in which the undesired color formation is said to be prevented by having an additive such as sodium borohydride present during the alkaline catalyzed alcoholysis of the polyvinyl ester. U.S. Pat. 3,086,963 describes a process for improving the thermal stability (color formation) of polyvinyl alcohol in which polyvinyl alcohol is treated with an alkali metal borohydride, i.e. sodium borohydride and acidified.

It is the principal object of this invention to provide a process for producing polyvinyl alcohol having improved color properties, that is, substantially color free polyvinyl alcohol. It is a further object of this invention to provide substantially color free polyvinyl alcohol solutions which remain color free at pH values of 7 or higher. It is also an object of this invention to provide substantially color-free polyvinyl alcohol which can be converted into compounds such as substantially color-free polyvinyl butyral. It is a further object of this invention to provide a process for preparing substantially color free polyvinyl alcohol which requires substantially less alkali metal borohydride to achieve approximately the same degree of color than is required when the borohydride treatment occurs after the alcholysis treatment.

SUMMARY OF THE IINVENTION

The method of the present invention comprises, in the preparation of polyvinyl alcohol by the alkali metal alcoholate-catalyzed alcoholysis of an alcoholic solution of a polyvinyl ester, the improvement comprising pretreating the alcoholic solution of the polyvinyl ester with from about 0.03% to about 3%, by weight, based on the weight of the polyvinyl ester, of an alkali metal borohydride, continuing the pretreatment of the polyvinyl ester until the liberation of nascent hydrogen ceases, and then alcoholyzing the pretreated polyvinyl ester.

DETAILED DESCRIPTION OF THE INVENTION

The alkali metal borohydride used in pretreating the polyvinyl ester is added to the alcoholic solution of the polyvinyl ester in an amount ranging from about 0.03% to about 3%, by weight, based on the weight of the polyvinyl ester in solution. In a preferred embodiment of this invention, from about 0.1% to about 1%, by weight, of alkali metal borohydride is added to the polyvinyl ester solution. The alkali metal borohydride may be added to the polyvinyl ester solution in any form; however, it is preferred to add the alkali metal borohydride in finely-divided form, especially as a powder. The alkali metal borohydride can be added to the polyvinyl ester in solution form. Suitable solvents include water and methanol; however, in the continuous operation of this process, it is preferred to add the alkali metal borohydride in powder form or as a slurry in methanol. Useful alkali metal borohydrides include sodium borohydride, potassium borohydride and lithium borohydride, with sodium borohydride being preferred in this process.

The alkali metal borohydride is combined with the polyvinyl ester solution at a temperature ranging from about 20° C. to about 150° C., preferably from about 45° C. to about 100° C., for a period of time sufficient to cause solution of the alkali metal borohydride in the polyvinyl ester solution, usually from about fifteen minutes to one hour being sufficient. While the pressure conditions employed may be sub-atmospheric or superatmospheric, especially at the higher temperatures, atmospheric pressure conditions are preferred.

The alkali metal borohydride dissolves in the polyvinyl ester solution with the liberation of nascent hydrogen. This provides a convenient determinent for measuring the end point of the borohydride treatment, that being, cessation of the liberation of nascent hydrogen. Usually, from about fifteen minutes to about one hour is required for the alkali metal borohydride pretreatment. The rapid liberation of nascent hydrogen causes expansion of the polyvinyl ester solution. The hydrogen is removed from the polyvinyl ester solution with the aid of agitation and when the expanded ester has collapsed to where no more than about one-third, preferably no more than about one-sixth, of the original expansion is evident, alcoholysis can proceed.

It is theorized that, during the alkali metal borohydride treatment of the polyvinyl ester solution, the nascent hydrogen hydrogenates the unsaturated bonds present in the polyvinyl ester-containing mixture thereby preventing reaction through the unsaturated bonds with resultant color formation during the subsequent alkaline-alcoholysis reaction.

The polyvinyl ester utilized in this invention may be derived from a carboxylic acid containing one to four carbon atoms such as formic, acetic, propionic and butyric acids. The polyvinyl ester, e.g. polyvinyl acetate, is treated in the form of an alcoholic solution in which the polyvinyl ester is present in a concentration of from about 20% to about 60%, preferably from about 30% to about 50%, by weight, based on the combined weight of polyvinyl ester and alcohol solvent. Suitable alcohols for the solution of the polyvinyl ester include the monohydroxy saturated aliphatic alcohols containing from one to four carbon atoms, such as methanol, ethanol, propanol and butanol, preferably methanol. After the alcoholic solution of polyvinyl ester has been pretreated with the alkali metal borohydride, the alcoholysis reaction may proceed. In general, the process followed is that described in U.S. Pat. 2,734,048.

Alcoholysis is accomplished with a hydrolytic alcohol selected from the group consisting of methanol, ethanol, the mono-methyl ether of ethylene glycol and the monoethyl ether of ethylene glycol. Methanol is the preferred hydrolytic alcohol. Preferably from about 1 to about 3 parts, by weight, of alcohol are employed for each part, by weight, of polyvinyl ester reacted.

The alcoholysis reaction is aided by the presence of an alkali metal alcoholate catalyst derived from an alkanol containing from 1 to about 10 carbon atoms. The preferred catalyst is sodium methylate. The catalyst is preferably added in the form of a solution in anhydrous alcohol, preferably made by reacting an alkali metal, such as sodium, with an excess of an anhydrous alcohol, e.g. methanol. Any alkali metal alcoholate may be used as a catalyst, e.g. potassium ethylate, lithium butylate, sodium propylate, sodium butylate, sodium decylate and the like. The catalyst is utilized in a concentration of from about 0.1% to about 5%, by weight, based on the weight of the reaction mixture. Preferably, from about 0.2% to about 0.5%, by weight, of sodium methylate is a satisfactory catalyst.

The alcoholysis reaction may be carried out at a temperature varying from about 20° C. to about 150° C., preferably from about 40° C. to about 100° C. While the pressure conditions used may be sub-atmospheric or superatmospheric, especially at the higher temperatures, atmospheric pressure conditions are preferred.

The alcoholysis reaction is preferably carried out in an apparatus consisting of multiple reaction vessels connected in series such that the effluent from the first reaction vessel flows into the second reaction vessel and the effluent from the latter is treated to recover the polyvinyl alcohol therefrom. Such an apparatus is defined with more specificity in U.S. Pat. 2,734,048.

The polyvinyl alcohol produced by this invention has improved color properties, that is, it is substantially color free and does not develop color when subjected to either alkaline or acid treatments. By substantially color free polyvinyl alcohol is meant polyvinyl alcohol having a color value, expressed as "percent yellow," no higher than about 5%, as determined with a Coleman Junior Spectrophotometer as a 4% solution of the polyvinyl alcohol in distilled water according to the method described hereinafter in Example 1.

In addition, this procedure produces substantially color-free polyvinyl alcohol with a minimum of alkali metal borohydride additives. Further, the treatment with the alkali metal borohydride has no adverse effects on the other desirable qualities of polyvinyl alcohol, that is, the stability, for example, of the polyvinyl alcohol is not affected by the treatment of the polyvinyl ester with an alkali metal borohydride. The film forming properties, rate of solution, and the temperature required for solution of the polyvinyl alcohol in water are also in no way adversely affected by the treatment with the alkali metal borohydride.

This invention may be more fully explained from a consideration of the following examples which are set forth for the purpose of illustration only and are not to be considered as limiting the scope of the invention.

Example 1

To 3000 grams of a solution of polyvinyl acetate (45%) and methanol (55%) is added with agitation 6.5 grams of sodium borohydride (about 0.5 g. sodium borohydride for 100 g. of polyvinyl acetate). Agitation is continued for 30 minutes while gas forms in the polymer solution. At the end of 15 minutes, maximum expansion of the polymer solution, approximately 40%, occurred and during the next 15 minutes the expanded mass collapsed to where only 15% expansion of the original volume was evident.

Six hundred and fifty ml. of methanol and 40 grams of sodium methylate are added with agitation to a glass reactor, fitted with a stainless steel paddle agitator and reflux condenser placed in a water bath heated to 55° C. When the sodium methylate is completely dissolved, the sodium borohydride-treated polyvinyl acetate solution is continuously added, with agitation, over an interval of 390 minutes. On completion of the polyvinyl acetate addition, an additional time interval of 30 minutes passes after which the reaction mixture is neutralized with glacial acetic acid, filtered through filter paper on a Büchner funnel, and washed with a volume of methanol equivalent to the volume of the initial filtrate. The Büchner funnel with filter cake is covered with filter paper and placed in an oven at 40–50° C. and dried with vacuum from a water aspirator for approximately 12 hours. The polyvinyl alcohol produced is relatively color free. The color of the polyvinyl alcohol is determined on the basis of the percent yellow which can be measured with a standard laboratory instrument such as a Coleman Junior Spectrophotometer. For example, an aliquot of the dry product is dissolved at 90–95° C. to form a 4% solution in distilled water. The color of the 4% solution at 25° C. was found to be 2.3% yellow.

The percent yellow is determined with a Coleman Junior Spectrophotometer by measuring the transmission (T) of light through the solution at wave length settings of 450, 560 and 640 A. and calculated by the equation:

$$\text{Percent yellow} = \frac{(T_{640} - T_{450}) \times 100}{T_{560}}$$

As a reference, distilled water measured under the same conditions gives 0% yellow.

Example 2

Another sample of the same polyvinyl acetate solution used in Example 1 is alcoholyzed by the procedure used in Example 1 without treatment with sodium borohydride. An aliquot of this dried product dissolved in distilled water as a 4% solution had a color of 16% yellow.

Example 3

The polyvinyl alcohol made in Example 2 is treated as a slurry (approximately 20% solids) in 40% methyl acetate and 60% methanol by addition of varying amounts of sodium borohydride (based on the equivalent amount of polyvinyl acetate) as indicated in Table 1 for 60 minutes each with agitation at 64° C. The results, as determined by the percent yellow, are shown in Table 1.

TABLE 1

| Polyvinyl alcohol prepared as in Example No. | Grams sodium borohydride per 100 grams polyvinyl acetate | Percent yellow, 4% aqueous solution of polyvinyl alcohol |
|---|---|---|
| 2 | 0 | 16.0 |
| 2 | 0.5 | 10.0 |
| 2 | 1 | 8.0 |
| 2 | 2 | 5.6 |
| 2 | 3 | 3.0 |
| 2 | 4 | 1.5 |

This table shows that, under the conditions of this example, it takes almost six times as much sodium borohydride to achieve the 2.3% yellow of Example 1 when a slurry of the polyvinyl alcohol is treated with sodium borohydride rather than treating the polyvinyl ester with sodium borohydride prior to the alcoholysis.

Example 4

The polyvinyl alcohol made in Example 2 is dissolved as a 4% solution in water at 90° C. To aliquots of this solution are added varying amounts of sodium borohydride (based on the equivalent amount of polyvinyl acetate) as shown in Table 2 after which agitation and heating at 90° C. are continued for 60 minutes. The solutions are cooled to 20° C. and the percent yellow determined. The results are listed in Table 2.

TABLE 2

| Polyvinyl alcohol prepared as in Example No. | Grams sodium borohydride per 100 grams polyvinyl acetate | Percent kellow 4% solution at 20° C. |
|---|---|---|
| 2 | 0 | 16.0 |
| 2 | 0.5 | 10.0 |
| 2 | 1 | 6.8 |
| 2 | 1.5 | 5.0 |
| 2 | 2 | 3.0 |
| 2 | 3 | 1.6 |

The results of treating polyvinyl alcohol with sodium borohydride as reported in Table 2 show that, under the conditions of this example, it requires about four times as much sodium borohydride to produce a polyvinyl alcohol having about 2.3 percent yellow as is required when the sodium borohydride is added prior to alcoholysis of the polyvinyl acetate as shown in Example 1.

The polyvinyl alcohol produced by the process described in this invention is markedly free of undesired yellow color and this is accomplished with a minimum amount of alkali metal borohydride as shown by comparing Example 1 with Examples 3 and 4. The polyvinyl alcohol made by this process may be converted to polyvinyl butyrals according to the processes described in U.S. Pats. 2,358,355 and 3,153,009 and then used to make substantially color-free laminated structures such as glass laminates.

What is claimed is:

1. In the preparation of polyvinyl alcohol by the alkali metal alcoholate-catalyzed alkaline alcoholysis of an alcoholic solution of a polyvinyl ester derived from a carboxylic acid containing from 1 to 4 carbon atoms, the improvement comprising pretreating the alcoholic solution of polyvinyl ester with from about 0.03% to about 3%, by weight, based on the weight of polyvinyl ester, of an alkali metal borohydride, continuing the pretreatment of the polyvinyl ester until the liberation of nascent hydrogen ceases, and then alcoholyzing the pretreated polyvinyl ester.

2. The method of claim 1 wherein the alcoholic solution of the polyvinyl ester is pretreated with from about 0.1 to about 1%, by weight, of an alkali metal borohydride.

3. The method of claim 1 wherein the alkali metal borohydride is a member of the group consisting of sodium borohydride, potassium borohydride and lithium borohydride.

4. The method of claim 3 wherein the alkali metal borohydride is sodium borohydride.

5. Polyvinyl alcohol prepared according to claim 1.

References Cited

UNITED STATES PATENTS

| 2,353,355 | 9/1944 | Stamatoff | 260—32 |
| 2,734,038 | 2/1956 | Bristol et al. | 260—91.3 |
| 2,862,916 | 12/1958 | Lukman et al. | 260—91.3 |
| 3,033,843 | 5/1962 | Inkip et al. | 260—91.3 |
| 3,086,963 | 4/1963 | Fuji et al. | 260—91.3 |
| 3,153,009 | 10/1964 | Rombach | 260—73 |

FOREIGN PATENTS

| 808,108 | 1/1959 | England | 260—91.3 |

JOSEPH L. SCHOFER, Primary Examiner

S. M. LEVIN, Assistant Examiner

U.S. Cl. X.R.

161—199; 260—89.1, 91.3 VA